United States Patent
Nilsson

[11] 3,833,227
[45] Sept. 3, 1974

[54] PRESSURE SEAL
[75] Inventor: Jan Nilsson, Robertsfors, Sweden
[73] Assignee: Allmanna Svenska Elektriska Aktiebolaget, Vasteras, Sweden
[22] Filed: Mar. 1, 1972
[21] Appl. No.: 230,727

[30] Foreign Application Priority Data
Mar. 15, 1971  Sweden.............................. 3281/71

[52] U.S. Cl................................. 277/176, 277/190
[51] Int. Cl............................................ F16j 15/56
[58] Field of Search .......... 277/143, 144, 188, 176, 277/190, 165, 177, 191

[56] References Cited
UNITED STATES PATENTS

| | | | |
|---|---|---|---|
| 852,714 | 5/1907 | Garlock | 277/191 |
| 2,739,855 | 3/1956 | Bruning | 277/188 |
| 3,071,386 | 1/1963 | Scannell | 277/188 X |

Primary Examiner—Samuel B. Rothberg

[57] ABSTRACT

A high pressure seal for sealing between a movable piston and the wall of a pressure chamber is formed of two rings which have oppositely sloping inward directions forming a V within which a resilient sealing strip fits. The two rings have sloping mating faces directed inwardly towards the axis of the cylinder.

2 Claims, 1 Drawing Figure

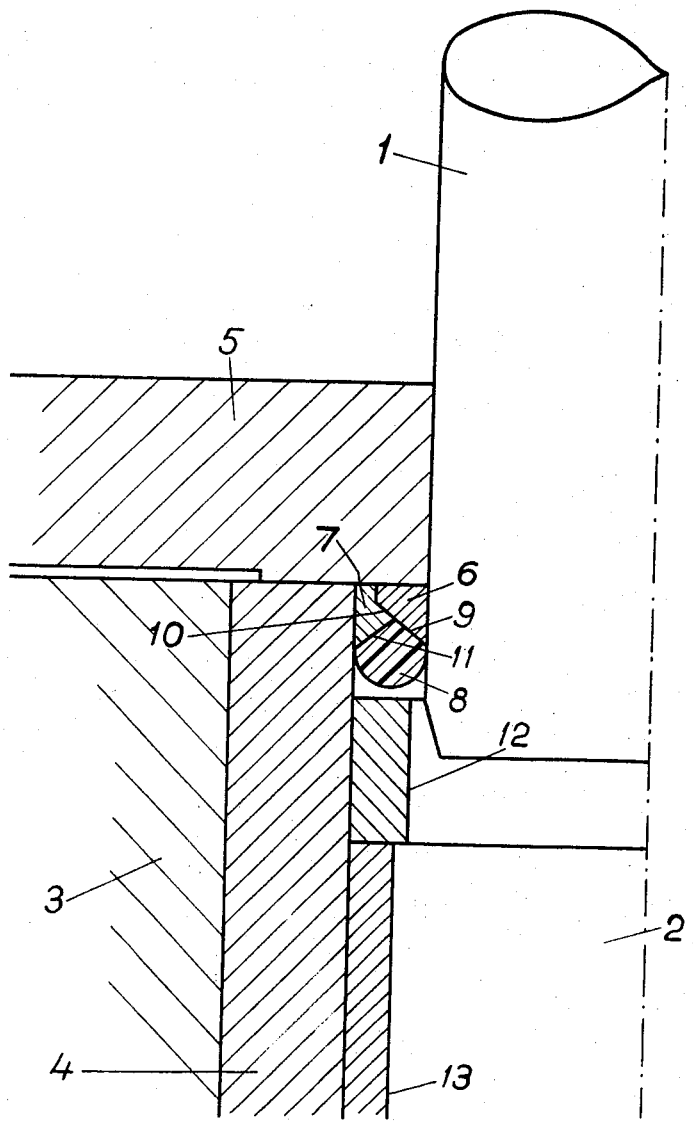

PRESSURE SEAL

BACKGROUND OF THE INVENTION

1. Field of the Invention

The present invention relates to a high pressure seal in a high pressure press to effect a seal between a movable piston, projectable into the pressure chamber, and the wall of the pressure chamber.

SUMMARY OF THE INVENTION

Two support rings are arranged in a sealing zone between the wall of the pressure chamber and the piston, these support rings together forming a contact surface facing the pressure chamber for a seal of elastomeric material arranged in the sealing zone, one of the sealing rings abutting the wall of the pressure chamber and the other abutting the piston at least when the pressure chamber is under pressure. The invention is characterised in that the support ring which abuts the wall of the pressure chamber has an inclined surface facing away from the pressure chamber, this surface, at least when there is low pressure in the pressure chamber, being in contact with a corresponding inclined surface on the other support ring and that the two inclined surfaces are substantially parallel to each other.

BRIEF DESCRIPTION OF THE DRAWINGS

The accompanying drawing shows the invention used as a seal between a stationary and a movable part in a high pressure press.

DESCRIPTION OF THE PREFERRED EMBODIMENTS

The drawing shows a cross section through the area nearest the sealing point. A piston 1 is movable within and is shown partly projected into the pressure chamber 2. The wall surrounding the pressure chamber is designated 3 and the pressure chamber may be provided with an exchangeable line 4 in known manner. The pressure chamber is limited at the top by an end closure 5, which also serves to keep the seals in position.

The space in the upper part of the pressure chamber which is bounded by the piston 1, end closure 5 and pressure chamber wall 3 — or liner 4 if there is one — will in the following be called the sealing zone. In this zone there are two support rings 6 and 7 and a seal 8 of elastomeric material, for example an O-ring of rubber. The support ring 6, which is nearest to the piston, is suitably made of bronze to give low friction against the piston, which is of steel. The other support ring consists of a steel ring having an outer diameter such that it is held against the liner 4. The surface 9 of the support ring 6 which faces the pressure chamber is inclined and, in the position shown in the drawing with a low pressure or none at all in the pressure chamber, the surface 9 abuts a surface 10 parallel therewith on the support ring 7. The support ring 6 is thus prevented from falling down into the pressure chamber even if the piston 1 is pulled out of the chamber. The surface 11 of the support ring 7 facing the pressure chamber is also inclined and the inclination is preferably, but not necessarily, the same as the two surfaces 9 and 11. These two surfaces provide contact surfaces for said sealing ring 8. At the same time the inclination of the surfaces causes the ring 7 to be pressed against the liner and held there and the ring 6 to be pressed against the piston. The inclination of the two surfaces is adjusted so that a suitable abutment pressure is obtained, particularly as regards this ring 6. It should provide the best possible seal against the piston, but at the same time the piston must be movable with respect to the ring. The abutment pressure may not be so great, therefore, that unnecessary friction is obtained. The inclination of the two surfaces 9 and 11 is chosen so that the surfaces form an angle with each other which is less than 180°.

When the piston moves downwards in the pressure chamber, the ring 6 tries to move also but is prevented because the inclined surface 9 of the ring 6 abuts against the inclined surface 10 of the ring 7. This is especially important when the pressure in the pressure chamber is low. At high pressure the seal 8 is pressed upwards against the two inclined surfaces 9 and 11 and thus presses the rings 6 and 7 upwards, but also apart from each other. The seal will also be in contact with the liner 4 and the piston 1 and will therefore prevent pressure medium from the chamber 2 from penetrating past the rings 6 and 7.

When the pressure increases in the pressure chamber, the two rings 6 and 7 will be removed from each other, mostly because the wall 3 and liner 4 expand and increase in diameter. Even so, the seal is maintained since the seal 8 is pressed upwards between the rings. The seal must therefore have such a large volume that in any event it will always abut the liner and the piston. When the pressure recedes and the rings 6 and 7 approach each other again the seal is at least partly forced out of the gap between the rings. However, some of the sealing material will probably remain between the rings and the seal must therefore be replaced after a while. The cost of this is low, however. In order to keep the seal in position in the sealing zone when no pressure prevails, a spacer ring 12 is inserted in the pressure chamber. The spacer ring is held in place in some suitable manner, for example with the help of a tube 13 which rests on the other end of the pressure chamber.

I claim:

1. High pressure seal in a high pressure press to effect a seal between a movable piston and the wall of a pressure chamber, into which said piston is projectable, said seal comprising first and second metallic support rings between the piston and the wall of the pressure chamber, said first ring (6) abutting the piston (1) at least when the pressure chamber is under pressure, said second ring (7) abutting the wall of the pressure chamber, in which said first ring (6) has an inclined surface (9) facing the pressure chamber (2), the second ring (7) has a first inclined surface (11) facing the pressure chamber, the angle between said two surfaces being less than 180°, said second ring (7) having a second inclined surface (10) facing away from the pressure chamber and substantially parallel to the inclined surface of the first ring, said second inclined surface being a support for said first ring at least when the pressure in the pressure chamber has a low value.

2. High pressure seal according to claim 1, said two inclined surfaces (9,11) constituting a seat and a seal ring (8) of elastomeric material engaged in said seat.

* * * * *